United States Patent [19]
Wilharm

[11] 3,740,146
[45] June 19, 1973

[54] OPERATING MEANS FOR USE IN FADING MECHANISMS OF MOTION PICTURE CAMERAS

[75] Inventor: Theo Wilharm, Hebsack, Post Geradstetten, Germany

[73] Assignee: Robert Bosch Photokino GmbH, Stuttgart, Germany

[22] Filed: Feb. 23, 1972

[21] Appl. No.: 228,657

[30] Foreign Application Priority Data
Mar. 2, 1971 Germany.................. P 21 09 739.2

[52] U.S. Cl. ................. 352/91, 192/48.9, 192/95, 352/217
[51] Int. Cl. .......................................... G03b 21/36
[58] Field of Search........................... 352/91, 217; 192/48.9, 95

[56] References Cited
UNITED STATES PATENTS
3,644,025  2/1972  Katsuyama............................ 352/91

Primary Examiner—Samuel S. Matthews
Assistant Examiner—Russell E. Adams, Jr.
Attorney—Michael S. Striker

[57] ABSTRACT

A fading mechanism for changing the size of the light-admitting aperture which is furnished by the diaphragm of a motion picture camera during the making of exposures with fade-in or fade-out effect has a control ring which is rotatable in a wall of the camera housing and is normally coupled to a gear of the diaphragm adjusting mechanism so that the user of the camera can adjust the diaphragm by rotating the control ring. A button which is movable axially of the control ring can shift the gear into mesh with a worm wheel which is rotated by the camera motor so that the diaphragm can be adjusted by the motor. The gear is disengaged from the worm wheel in automatic response to completion of a given number of exposures with fade-in or fade-out effect.

10 Claims, 2 Drawing Figures

Patented June 19, 1973 3,740,146

OPERATING MEANS FOR USE IN FADING MECHANISMS OF MOTION PICTURE CAMERAS

BACKGROUND OF THE INVENTION

The present invention relates to motion picture cameras in general, and more particularly to improvements in fading mechanisms for motion picture cameras. Still more particularly, the invention relates to improvements in operating means which are used in fading mechanisms to allow for the making of effect shots, known as exposures with fade-in and/or fade-out effect, either by hand or with assistance from the camera motor or from a discrete prime mover.

It is already known to provide a motion picture camera with a fading mechanism which can change the size of a light-admitting aperture furnished by the diaphragm so as to make exposures with fade-out effect in response to gradual reduction of the aperture size and to make exposures with fade-in effect in response to gradual increase of the aperture size. It is also known to provide a motion picture camera with a fading mechanism having means for changing the aperture size by hand or by means of the camera motor. To this end, the camera motor must be temporarily coupled to the adjusting mechanism for the diaphragm in order to operate the adjusting mechanism in a direction to increase or reduce the aperture size.

A drawback of presently known fading mechanisms wherein the aperture size can be changed by hand or with assistance from the camera motor is that the connections between the diaphragm and the manually actuated control member as well as between the diaphragm and the camera motor are very complex, prone to malfunction and contribute excessively to the cost of the fading mechanism. Furthermore, the various manually actuatable control members of the fading mechanism are normally mounted on the camera housing at several mutually spaced locations so that the user of the camera must memorize such locations in order to make sure that an appropriate control member is actuated when it becomes necessary to make exposures with fade-in or fade-out effect.

SUMMARY OF THE INVENTION

An object of the invention is to provide a novel and improved fading mechanism for use in motion picture cameras and to construct and assemble the fading mechanism in such a way that it is capable of adjusting the diaphragm either in response to movements of a manually actuatable control member or in response to connection of the diaphragm adjusting means to a prime mover of the camera.

Another object of the invention is to provide the fading mechanism with novel and improved operating means for the diaphragm adjusting means.

A further object of the invention is to provide a fading mechanism which is constructed and assembled in such a way that manual or motorized adjustments of the diaphragm can be initiated and effected by control members located in a single location for convenient access to the user during the making of exposures.

An additional object of the invention is to provide a fading mechanism whose operation requires less attention on the part of the user than heretofore known fading mechanisms of identical versatility.

A further object of the invention is to provide a fading mechanism which occupies less room than presently known fading mechanisms and whose operating means can be installed in their entirety in or on any desired single part of the camera housing, for example, so as to be accessible to the hand which actuates the camera release.

The invention is embodied in a motion picture camera which comprises a body or housing, an adjustable diaphragm which is mounted in the housing and defines a light-admitting aperture of variable size, motor-operated drive means which can transport the film forwardly and preferably also rearwardly and is mounted in the housing, and novel fading means including an adjusting mechanism which is operative to adjust the diaphragm so as to gradually reduce the aperture size during the making of exposures with fade-out effect and to gradually increase the aperture size during the making of exposures with fade-in effect (whereby the making of exposures with fade-in effect may precede or follow the making of exposures with fade-out effect, or the film portion which was exposed with fade-out effect can be transported rearwardly and thereupon exposed again but with fade-in effect). The fading means further comprises operating means including a first control member which is actuatable to thereby effect the operation of the adjusting mechanism and a second control member which is closely adjacent to the first control member and is actuatable to thereby establish an operative connection between the drive means and the adjusting mechanism.

In accordance with a presently preferred embodiment of the invention, the control members are coaxial with each other and are actuatable by hand independently of each other. One of the control members is preferably rotatable about its axis and the other control member is preferably movable axially of and within the one control member. The control members may be mounted on a wall which can form part of the camera body or housing proper (i.e., of that portion of the housing which carries the lens and receives the film) or of a handle which is permanently or detachably secured to the body proper.

The novel features which are considered as characteristic of the invention are set forth in particular in the appended claims. The improved operating device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
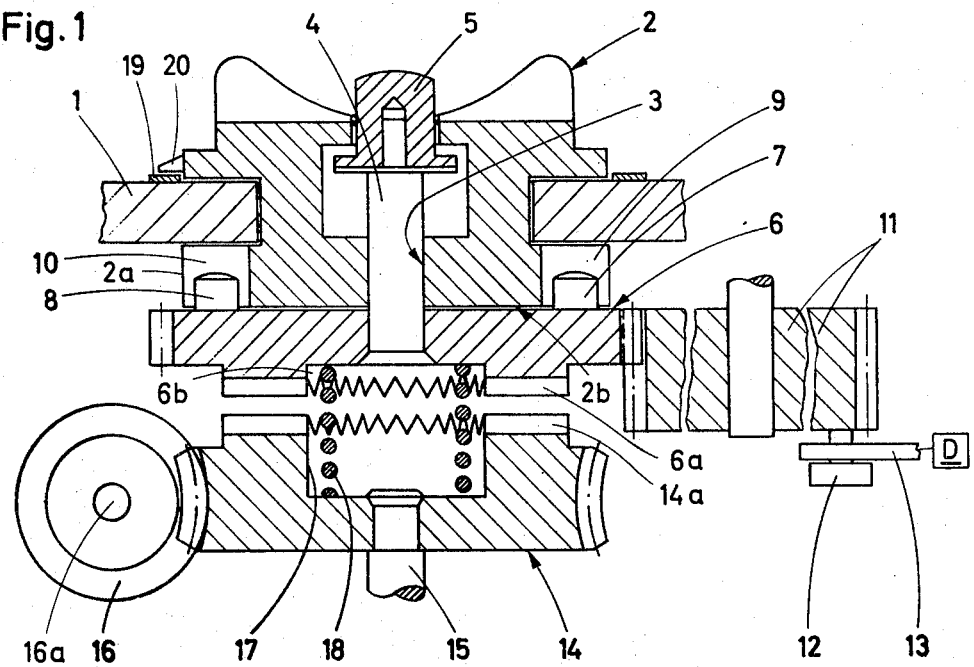
FIG. 1 is an enlarged fragmentary sectional view of a motion picture camera which embodies the improved fading means, the reciprocable control member of the operating means being shown in a first axial position in which the camera is set for manual control of a fading operation.

The drawing illustrates a portion of a multi-function motion picture camera having a housing or body which includes a wall 1. The wall 1 may form part of a handle or of that portion of the housing which carries the lens and contains motion picture film. A ring-shaped rotary member 2 of the operating means of the fading means is mounted in the wall 1 with at least some friction so that its exposed handgrip portion can be turned by hand but that it normally dwells in the selected position. The rotary member 2 is held by the wall 1 against axial movement with reference to the housing. This rotary member (hereinafter called control member or control ring) has an axial bore 3 for a reciprocable control member or button 4 the outer end portion of which is connected with a handgrip portion or knob 5 accessible at the outer side of the control ring 2. The inner end portion of the control member or button 4 is connected with a torque receiving gear 6 which is located in the interior of the camera housing and is provided with two male coupling members or projections 7, 8 located diametrically opposite each other and extending toward the inner side of the wall 1. When the button 4 is caused to assume the outer or first end position shown in FIG. 1, the projections 7, 8 can extend into complementary recesses or sockets 9, 10 provided therefor in the inner end face of a female coupling portion or collar 2a on the control ring 2 so that the gear 6 is then compelled to share all angular movements of the control ring.

The peripheral teeth of the gear 6 mate with the teeth of a second gear 11 which, together with the gear 6, forms part of an adjusting mechanism of the fading means and serves to adjust the exposure control means of the camera. In the illustrated embodiment, the gear 11 is provided with an eccentric pin 12 which can move a diaphragm setting member 13. The diaphragm D may comprise a set of blades or vanes which define a light-admitting aperture whose size increases when the gear 11 rotates in a first direction and whose size decreases when the gear 11 is rotated in a second direction. The diameter of the gear 11 preferably equals the diameter of the gear 6. A diaphragm which can be adjusted by the mechanism including the parts 6, 11–13 is disclosed, for example, in U.S. Pat. No. 2,672,073.

The torque receiving gear 6 constitutes one element of a claw clutch which further includes a torque transmitting second clutch element 14 mounted in the housing of the camera for rotation about the axis of a shaft 15 which is coaxial with the button 4. As shown, the inner end face of the gear 6 is provided with radially extending teeth or claws 6a which can be brought into mesh with the teeth or claws 14a of the clutch element 14 when the button 4 is depressed to assume the second or inner end position shown in FIG. 2. A helical spring 18 which reacts against the clutch element 14 and bears against the gear 6 tends to maintain the button 4 in the outer end position of FIG. 1 in which the clutch including the claws 6a, 14a is disengaged. The spring 18 is partially received in a recess 17 in the upper end face of the clutch element 14 and extends into a registering recess 6b in the inner end face of the gear 6.

A portion of the clutch element 14 constitutes a worm wheel which meshes with a worm 16 on the output shaft 16a of an electric camera motor. The parts 14, 16, 16a constitute motor-operated drive means which can operate the adjusting means 6, 11–13 of the fading means in response to movement of the button 4 to the end position shown in FIG. 2.

The operation is as follows:

When the button 4 dwells in the outer end position of FIG. 1, the torque receiving gear 6 of the diaphragm adjusting means is coupled to the control ring 2 because the projections 7, 8 respectively extend into the sockets 9, 10. Therefore, the exposures with fade-out and fade-in effect can be made manually by rotating the control ring 2 in the desired direction. For example, if the control ring 2 is rotated in a clockwise direction, the gear 6 also rotates in a clockwise direction to rotate the gear 11 in a counterclockwise direction. The pin 12 then causes the setting member 13 to adjust the diaphragm D so that the latter defines an aperture of decreasing size. The camera makes exposures with fade-out effect. By rotating the control ring 2 in a counterclockwise direction, the use of the camera causes the gears 6 and 11, pin 12 and setting member 13 to adjust the diaphragm D so that the latter defines an aperture of increasing size, i.e., the camera makes exposures with fade-in effect.

If the user wishes to expose a certain number of film frames first with fade-out effect and to thereupon expose the same film frames with fade-in effect, the button 4 is depressed by way of the knob 5 so that the claws 6a move into mesh with the claws 14a. The clutch 6, 14 transmits torque from the output shaft 16a of the camera motor to the gear 11 which causes the setting member 13 to adjust the diaphragm D so that the camera makes a series of exposures with fade-out effect. The projections 6, 7 are withdrawn from the respective sockets 9, 10 when the knob 5 is depressed. If the camera motor is on, the torque receiving gear 6 begins to rotate in immediate response to movement of its claws 6a into mesh with the claws 14a. Consequently, the user of the camera can relax or completely terminate the pressure on the knob 5 because the gear 6 is compelled to remain in mesh with the torque transmitting clutch element 14 since the projections 7, 8 are out of register with the sockets 9, 10, i.e., the spring 18 cannot expand. The tips of the projections 7, 8 slide along the inner end face 2b of the control ring 2 and respectively enter the recesses 10, 9 when the gear 6 completes one-half of a revolution. Such angular movement of the gear 6 suffices to enable the camera to make a predetermined number of exposures with fade-out effect. The axial length of the gear 11 is such that its teeth remain in mesh with the peripheral teeth of the gear 6 in each axial position of the button 4. Therefore, the output shaft 16a can rotate the gear 11 when the knob 5 has been depressed and the inner end face 2b of the control ring 2 holds the button 4 against return movement to the outer end position of FIG. 1.

After the gear 6 completes an angular movement of 180 degrees, the projections 7, 8 respectively register with the sockets 10, 9 and the spring 18 is free to expand so that the button 4 returns to its outer end position as the projections 7, 8 respectively enter the sockets 10, 9. The gear 6 ceases to rotate because its radially extending claws 6a are out of mesh with the claws 14a of the clutch element 14.

The film transporting mechanism is thereupon operated in reverse so as to move rearwardly those frames of motion picture film which were exposed with fade-out effect. The means for insuring that the rearward transport of motion picture film is completed after a predetermined number of film frames has been moved to a position upstream of the light-admitting aperture are well known in the art of motion picture cameras which are provided with fading means. Reference may be had, for example, to the copending application Ser. No. 232,464, filed Mar. 7, 1972 by Gerhard Börner. Once the rearward transport of those film frames which were exposed with fade-out effect is completed, the user of the camera again depresses the knob 5 to move the button 4 to the inner end position of FIG. 4. The camera motor then drives the gear 6 which drives the gear 11 so that the setting member 13 gradually increases the aperture size whereby the film frames which were exposed with fade-out effect are exposed again but with fade-in effect. The projections 7, 8 respectively return into register with the sockets 9, 10 and the spring 18 is free to expand and to thus disengage the gear 6 from the clutch element 14. The making of exposures with fade-in effect is completed but the camera continues to make exposures in the normal way as long as the user continues to actuate the camera release element (not shown).

Figure 2:
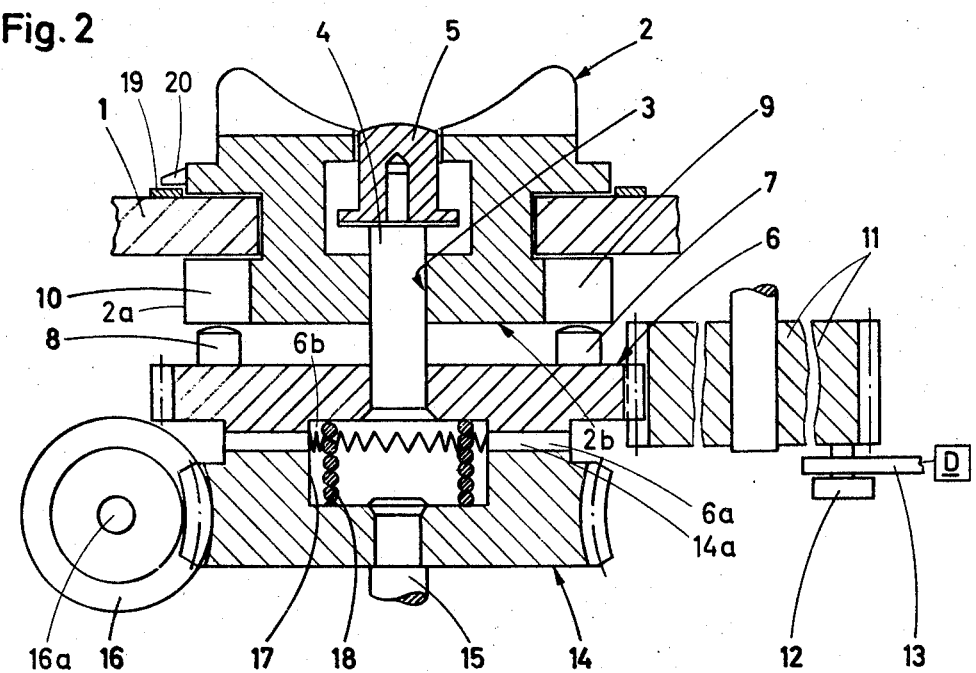
FIG. 2 illustrates the structure of FIG. 1 but with the reciprocable control member of the operating means in a second axial position in which the camera is set to enable the drive means to adjust the diaphragm during the making of exposures with fade-in or fade-out effect.

The operative connection between the gear 11 and the diaphragm D is such that the size of the light-admitting aperture decreases while the pin 12 moves in a direction to the left, as viewed in FIG. 1 or 2, and that the aperture size increases while the pin 12 moves in the opposite direction. In the illustrated embodiment, the gear 11 is rotated through 180 degrees in response to each half revolution of the gear 6, either under the action of the control ring 2 or under the action of the worm 16.

If desired, the camera may be provided with a detent which yieldably holds the control ring 2 against angular movement from the selected position when the gear 6 receives torque from the clutch element 14 and its projections 7, 8 bear against the surface 2b of the collar 2a under the bias of the spring 18. However, it was found that a certain amount of friction between the control ring 2 and the wall 1 normally suffices to prevent unintentional angular displacements of the control ring.

The outer side of the wall 1 is preferably provided with an arcuate scale or dial 19, and the control ring 2 is then provided with an index or pointer 20 to pinpoint on the scale the momentary angular position of the control ring. The graduations of the scale 19 indicate various aperture sizes which are furnished by the diaphragm D in the momentary positions of the control ring 2. Furthermore, the operator can immediately determine whether the control ring 2 has been rotated by hand to make exposures with fade-out effect or whether the control ring dwells in its normal position in which the diaphragm D defines an aperture of maximum size and is ready to make normal exposures or exposures with fade-out effect (the latter in response to depression of the knob 5). The scale 19 need not extend beyond an arc of 180 degrees because, in the illustrated embodiment, the control ring 2 must merely turn through one half revolution in one direction to close the diaphragm D and through one half revolution in the opposite direction to cause the diaphragm to define an aperture of maximum size. The positions of the scale 19 and index 20 can be reversed, i.e., the scale can be provided on the control ring 2 to rotate relative to a stationary index.

When the exposures with fade-out effect and fade-in effect are being made while the gear 6 receives torque from the clutch element 14, the gear 11 of the diaphragm adjusting mechanism can rotate in a single direction, namely, first through 180° to gradually close the diaphragm D during the making of exposures with fade-out effect and thereupon again through 180° and in the same direction to gradually open the diaphragm to full aperture size. The control ring 2 may also be used to reduce the aperture size by one or more f/stops for the making of normal exposures without fade-out or fade-in effect.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a motion picture camera, a combination comprising an adjustable diaphragm defining a light-admitting aperture of variable size; motor-operated drive means; and fading means including adjusting means operative to adjust said diaphragm so as to gradually reduce the aperture size during the making of exposures with fade-out effect and to gradually increase the aperture size during the making of exposures with fade-in effect, and operating means comprising a first control member actuatable to thereby effect the operation of said adjusting means and a second control member actuatable to thereby establish an operative connection between said drive means and said adjusting means, said control members having portions adjacent to each other manually engageable located immediately for one hand.

2. A combination as defined in claim 1, wherein said control members are coaxial with each other and said handgrip portions thereof are actuatable independently of each other.

3. In a motion picture camera, a combination comprising an adjustable diaphragm defining a light-admitting aperture of variable size; motor-operated drive means; and fading means including adjusting means operative to adjust said diaphragm so as to gradually reduce the aperture size during the making of exposures with fade-out effect and to gradually increase the aperture size during the making of exposures with fade-in effect, and operating means comprising a first control member actuatable by hand to thereby effect the operation of said adjusting means and a second control member coaxial with and closely adjacent to said first control member and being actuatable by hand to thereby establish an operative connection between said drive means and said adjusting means, said control members being actuatable independently of each other and one thereof being rotatable about its axis and the other thereof being movable axially of said one control member.

4. A combination as defined in claim 3, wherein said one control member is said first control member and said adjusting means comprises a torque receiving element which is coaxial with said first control member and is movable by said second control member axially between a first position in which said element can receive torque from said first control member and a second position in which said element can receive torque from said drive means.

5. A combination as defined in claim 4, wherein said first control member and said torque receiving element are provided with cooperating male and female coupling means for rotating said element in response to rotation of said first control member in said first position of said element.

6. A combination as defined in claim 5, wherein said female coupling means comprises two sockets located diametrically opposite each other with reference to said axis and said male coupling means comprises two projections receivable in said sockets in two predetermined angular positions of said element and said first control member relative to each other.

7. A combination as defined in claim 4, wherein said drive means comprises a torque transmitting element which engages with and rotates said torque receiving element in said second position of said torque receiving element.

8. A combination as defined in claim 7, wherein said torque transmitting element comprises a worm wheel and said adjusting means further comprises a mobile diaphragm setting member operatively connected with said torque receiving element in each of said first and second positions of said torque receiving element.

9. A combination as defined in claim 4, wherein said torque receiving element comprises a first gear and said adjusting means further comprises a second gear in permanent mesh with said first gear.

10. A combination as defined in claim 4, further comprising means for permanently biasing said torque receiving element to said first position thereof.

* * * * *